United States Patent
Hurter

(10) Patent No.: US 11,484,107 B2
(45) Date of Patent: Nov. 1, 2022

(54) ELECTRONIC NAIL FILE WITH DIGITAL CONTROL AND DISPLAY AND SYSTEM OF OPERATION

(71) Applicant: Kupa, Inc., Anaheim, CA (US)

(72) Inventor: Richard B. Hurter, Castaic, CA (US)

(73) Assignee: Kupa, Inc., Anaheim, CA (US)

( * ) Notice: Subject to any disclaimer, the term of this patent is extended or adjusted under 35 U.S.C. 154(b) by 78 days.

(21) Appl. No.: 16/885,155

(22) Filed: May 27, 2020

(65) Prior Publication Data
US 2020/0375336 A1    Dec. 3, 2020

Related U.S. Application Data
(60) Provisional application No. 62/853,560, filed on May 28, 2019.

(51) Int. Cl.
*A45D 29/05* (2006.01)
*G08C 17/02* (2006.01)
*H02J 7/00* (2006.01)

(52) U.S. Cl.
CPC .............. *A45D 29/05* (2013.01); *G08C 17/02* (2013.01); *H02J 7/0045* (2013.01); *H02J 7/0047* (2013.01); *G08C 2201/30* (2013.01)

(58) Field of Classification Search
CPC .... A45D 29/05; G08C 17/02; G08C 2201/30; H02J 7/0045; H02J 7/0047; H02J 7/0044
See application file for complete search history.

(56) References Cited

U.S. PATENT DOCUMENTS

| 4,454,454 A | 6/1984 | Valentine |
| D361,978 S | 9/1995 | Shirai et al. |
| D405,232 S | 2/1999 | Stevens et al. |

(Continued)

FOREIGN PATENT DOCUMENTS

| CN | 305077824 S | 3/2019 |
| KR | 101508491 B1 * | 4/2015 |

OTHER PUBLICATIONS

Kupa Inc. Website, "Passport Complete (Prince/Princess)," https://kupainc.com/collections/nav-e-file/products/mp-passport-my-prince-cradle, publication date unknown, site visited May 29, 2020.

(Continued)

*Primary Examiner* — Adnan Aziz
(74) *Attorney, Agent, or Firm* — Stetina Brunda Garred and Brucker

(57) ABSTRACT

Disclosed is a portable electric nail file, and a system comprising an electric nail file handpiece having a motor and a power unit having a rechargeable battery for supplying power to said electric nail file. The power unit has manual digital control interface in the form of a click wheel to enable a user to control the direction and speed of the motor of the electric nail file. The interface communicates to a processor for controlling the operation of the electric nail file the processor executing stored software instructions. The device and system include a communication element for receiving signals from a foot pedal by low power radio signal control of the direction and speed of the electric nail file motor. A docking cradle engages the power unit and through metal contacts is operable to recharge the battery of the power unit. The cradle also incorporates display indicating speed and direction.

26 Claims, 14 Drawing Sheets

(56) References Cited

U.S. PATENT DOCUMENTS

| | | | |
|---|---|---|---|
| 6,017,354 A * | 1/2000 | Culp | A61B 17/32002 606/170 |
| D426,809 S | 6/2000 | Stevens et al. | |
| D446,499 S | 8/2001 | Andre et al. | |
| D511,401 S | 11/2005 | Park | |
| D530,424 S | 10/2006 | Manser et al. | |
| D603,561 S | 11/2009 | Cho | |
| D607,847 S | 1/2010 | Elliott et al. | |
| D612,814 S | 3/2010 | Nishikawa | |
| D649,560 S | 11/2011 | Hurter et al. | |
| D743,335 S | 11/2015 | Chang | |
| 9,385,549 B2 | 7/2016 | Miller et al. | |
| D822,280 S | 7/2018 | Dadon et al. | |
| D825,107 S | 8/2018 | Du | |
| 10,247,475 B2 * | 4/2019 | Valia | A45D 29/00 |
| 10,357,094 B1 * | 7/2019 | Luu | A45D 29/00 |
| D867,322 S | 11/2019 | Yan | |
| D868,724 S | 12/2019 | Xie | |
| 10,694,828 B2 * | 6/2020 | Ortiz | A45D 29/004 |
| D889,426 S | 7/2020 | Fu | |
| D895,210 S | 9/2020 | Wu | |
| 2002/0064756 A1 * | 5/2002 | Pagnini | A61C 1/003 433/102 |
| 2006/0020258 A1 * | 1/2006 | Strauss | A61B 17/1626 606/1 |
| 2006/0047200 A1 * | 3/2006 | Miyazawa | G01R 31/3648 600/471 |
| 2006/0137703 A1 | 6/2006 | Kling | |
| 2007/0250098 A1 * | 10/2007 | Malackowski | A61B 17/1626 606/170 |
| 2007/0254261 A1 * | 11/2007 | Rosenblood | A61C 17/20 433/98 |
| 2010/0083975 A1 | 4/2010 | Nguyen et al. | |
| 2013/0092182 A1 | 4/2013 | Stockbauer | |
| 2017/0172583 A1 * | 6/2017 | Wildgen | A61B 17/1628 |
| 2018/0042802 A1 * | 2/2018 | St. Louis | A61C 1/0007 |
| 2020/0275756 A1 * | 9/2020 | Amar | A45D 29/06 |
| 2020/0297171 A1 * | 9/2020 | Ma | A45D 29/18 |

OTHER PUBLICATIONS

Kupa Inc. Website, "U-Power UP-200," https://kupainc.com/collections/nav-e-file/products/upower-up-200, publication date unknown, site visited May 29, 2020.

Kupa Inc. Website, "U-Power Super UP-200," https://kupainc.com/collections/nav-e-file/products/super-upower-up-200-110-volt, publication date unknown, site visited May 29, 2020.

Kupa Inc. Website, "U-Power Portable G-3," https://kupainc.com/collections/nav-e-file/products/upower-portable-g-3-110-volt, publication date unknown, site visited May 29, 2020.

Kupa Inc. Website, "Manipro KP-5000," https://kupainc.com/collections/nav-e-file/products/manipro-kp-5000, publication date unknown, site visited May 29, 2020.

Kupa Inc. Website, "MP-Passport w/ Matching KP-55 (TEAL)," https://kupainc.com/collections/nav-e-file/products/manipro-passport-limited-edition-teal-with-desktop-cradle, publication date unknown, site visited May 29, 2020.

* cited by examiner

ELECTRONIC NAIL FILE WITH DIGITAL CONTROL AND DISPLAY AND SYSTEM OF OPERATION

CROSS-REFERENCE TO RELATED APPLICATIONS

The present application claims the benefit of U.S. Provisional Application No. 62/853,560, filed May 28, 2019, the contents of which are expressly incorporated herein by reference.

STATEMENT RE: FEDERALLY SPONSORED RESEARCH/DEVELOPMENT

Not Applicable

BACKGROUND

Technical Field

The present inventive subject matter relates generally to an electronic nail file having digital control interface and charging cradle having a display. More particularly, the inventive subject matter relates to a portable electronic nail file that has a digital user interface, along with a foot pedal capable of controlling the nail file by Bluetooth® RF communication. The device also includes a re-charging carriage that includes a digital display.

Background

Traditional electric nail files for manicures in the nail salon industry include a stationary variable speed control box that provides power and control to a handpiece. The hand piece typically includes a motor for spinning a mandrel that is used in filing and servicing nails. The handpiece is interconnected to the control box by a cord that provides power and control to the handpiece. The control boxes typically have an analog on-off switch, an illuminated power indicator, a speed control dial to change the speed of the rotating hand piece, and an analog switch for changing the direction of the rotating hand piece, i.e. forward and reverse. One such device is MANIPro original offered by Kupa, Inc. of Anaheim, Calif. Such stationary control box electric nail files must be positioned in close proximity of the handpiece limited by the length of an interconnecting cord. As such, such stationary control boxes for electric nail files have limited portability. In addition, control of the handpiece is limited to analog switches and dials resident on the control box.

Portable electric nail files have also been offered such as the MANIPro Passport, sold by Kupa, Inc. of Anaheim, Calif. Portable electric nail files have a smaller and lighter portable control box including a rechargeable battery that interconnect to a rotating handpiece by a cord. An analog dial is located on the top of the control box, along with a power indicator and an analog switch for changing the rotation of direction of the rotating mandrel. Portable electric nail files can provide anywhere from 8 to 10 hours of use per charge in either 110 v or 220 v. A user charges the control box, and then can disconnect the charging cord, and have a portable electric nail file. A belt clip and a plastic handpiece holster which can connect to the control box. In this way a portable electric nail file user can move about and use the nail file while the control box remains charged.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

BRIEF SUMMARY

The inventive subject matter described herein demonstrates a portable electric nail file, and a system for operating the same comprising an electric nail file handpiece having a motor and a power unit having a rechargeable battery for supplying power to said electric nail file. The power unit has manual digital control interface in the form of a click wheel to enable a user to control the direction and speed of the motor of the electric nail file. The interface communicates to a processor for controlling the operation of the electric nail file, connected to a memory having stored software instructions. The device and system include a communication element for receiving operational signals from a foot pedal via a low power radio signal to also provide control of the direction and speed of the motor of the electric nail file. A docking cradle engages the power unit through electronic connectors or leads operable to recharge the battery supply of the power unit. The cradle also includes an electronic display showing the speed and direction of rotation of the handpiece, the power status and charge status of the device.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
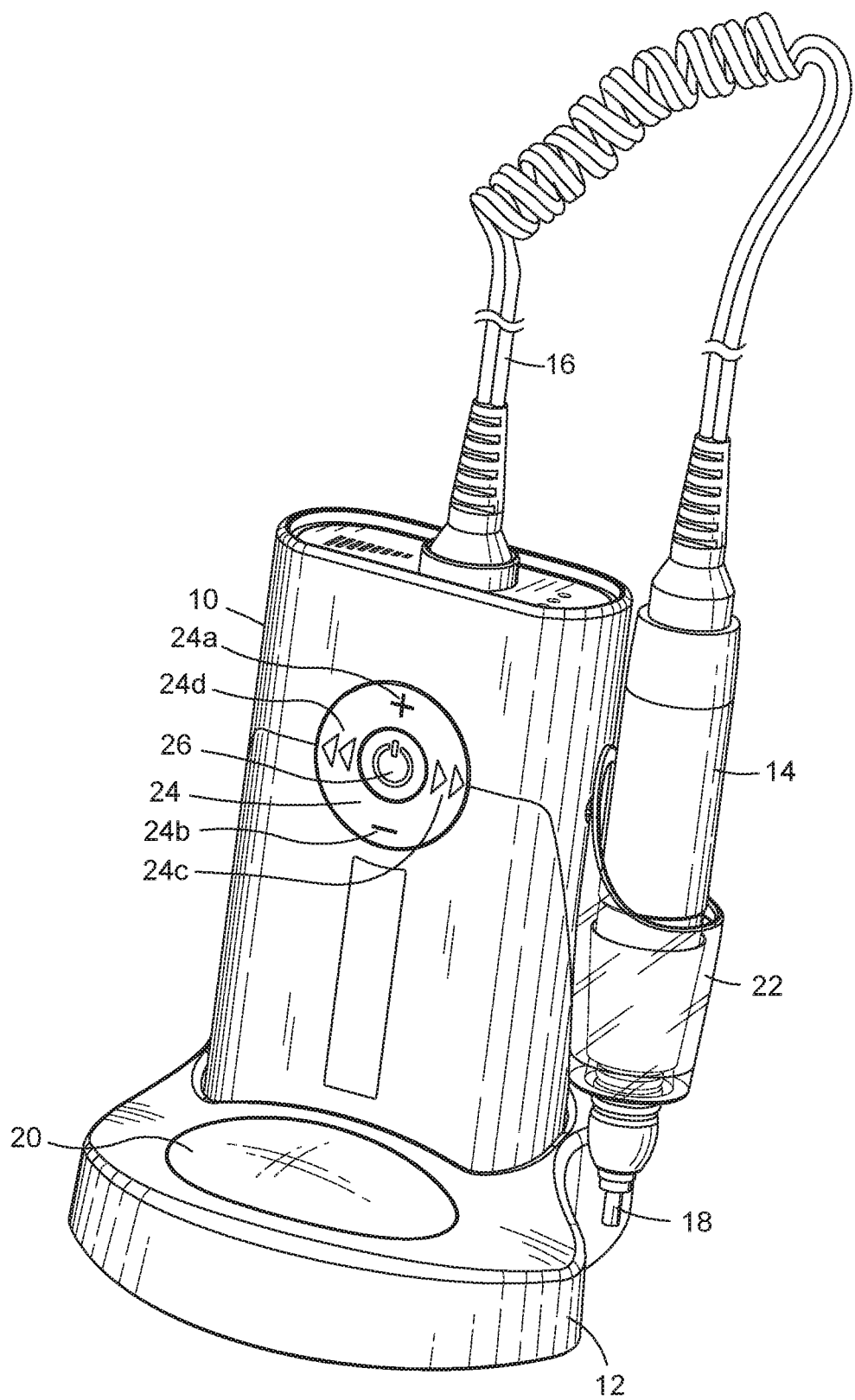
FIG. 1 is the described portable electric nail file positioned in a recharging carriage.

The detailed description set forth below in connection with the appended drawings is intended as a description of certain embodiments of an electric nail file apparatus, system and method and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

The background, summary and the above description includes information that may be useful in understanding the present disclosure. It is not an admission that any of the information provided herein is prior art or relevant to the presently claimed inventive subject matter, or that any publication specifically or implicitly referenced is prior art.

In some embodiments, the numbers expressing dimensions, quantities, quantiles of ingredients, properties of materials, and so forth, used to describe and claim certain embodiments of the disclosure are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable. The numerical values presented in some embodiments of the disclose may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the disclosure and does not pose a limitation on the scope of the claimed inventive subject matter. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Various objects, features, aspects and advantages of the inventive subject matter will become more apparent from the following detailed description of preferred embodiments, along with the accompanying drawing figures in which like numerals represent like components.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Referring particularly to FIG. 1, there is shown the disclosed electric nail file control box 10 nested in a charging base 12. A nail file handpiece 14 is interconnected to the control box 10 via a cord 16. The cord 16 supplies power and control signals from the box 10 to the handpiece 14. The handpiece 14 includes a rotating electric motor (not shown) that drives a rotating bit 18. Electric nail files tools can be attached to the rotating bit 18 such as sanding bands used for nail manicures or other manicure tools (not shown). The charging base 12 also includes a display screen 20 to display particulars of operation of the control box 10 and handpiece 14 when the control box 10 is placed in the charging base 12 such as rotation speed, direction of rotation, power status and battery status and capacity. A retainer 22 is releasably attached to the side of the control box 10, so that a handpiece 14 can be stowed on the side of the box 10 when the handpiece 14 is not in use.

Importantly, the control box 10 includes digital control interface in the form of a click wheel 24. Click wheel 24 is sensitive to depression by a finger or other depressive force and includes underlying contacts or sensors (shown for example in FIG. 9). For example, a user depresses the center button 26 to toggle on and off power of the control box 10. The click wheel 24 power button 26 has a discernable click to alert the user that the power button 26 has been contacted. In addition to an underlying contact (shown for example in FIG. 9) residing under the center power button 26, an additional four contacts underlie the click wheel (shown for example in FIG. 9) positioned at 0 degrees at the top of the click wheel 24 circle, location 24a and 180 degrees at the bottom of the click wheel 24, location 24b (down arrow). By way of example, by pressing location 24a on the click wheel 24, the control box sends a signal for the handpiece 14 motor to increase speed and by pressing location 24b on the click wheel 24, the control box sends a signal to the handpiece 14 motor to decrease speed. Also, location 24c is positioned at 90 degrees on the click wheel 24 and pressing at location 24c causes an underlying contract to cause the control box to instruct the handpiece 14 motor to run in the forward direction and location 24d is positioned at 270 degrees on the click wheel 24 and pressing location 24d causes the control box to instruct the handpiece 14 motor to run in the reverse direction. Because the control box 10 includes a digital control system of the handpiece 14 motor, the click wheel 24 interface provides enhanced user control of the electric nail file box 10 and handpiece 14 over conventional electric nail files that rely upon analog dials for motor speed control, and analog on/off switches for power or motor direction.

Figure 2:
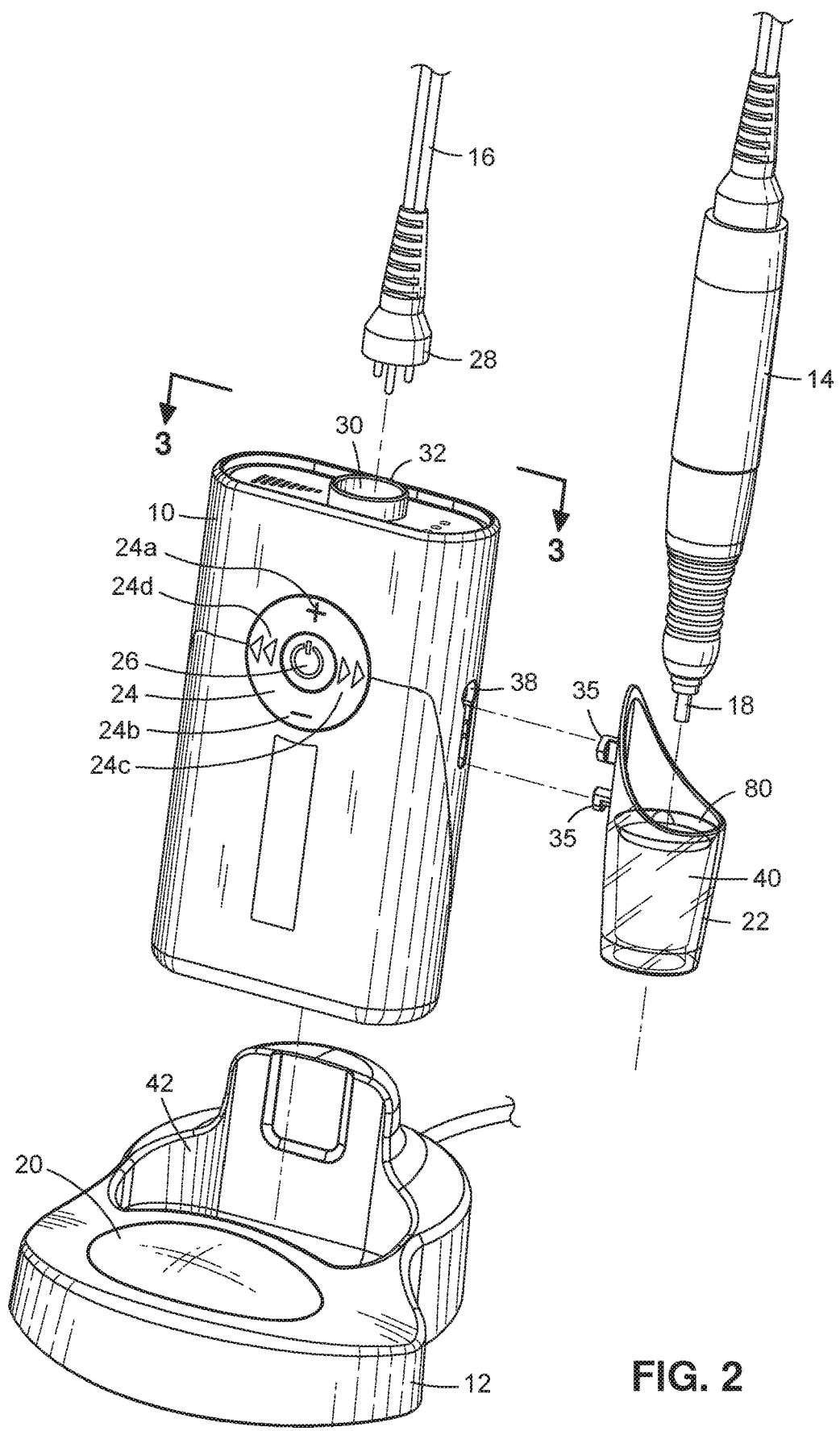
FIG. 2 is an exploded view of the electric nail file and recharging carriage of FIG. 1.

Referring particularly to FIG. 2 there is shown an exploded view of components of FIG. 1, including the electric nail file control box 10, base 12, cord 16, handpiece 14 and retainer 22 to demonstrate how such components interconnect and separate. Cord 16 includes a three-prong interface 28 that is received into an interface port 30, having a corresponding three recesses (see FIG. 3) to receive the three prongs of the three-prong interface 28. A port lip 32 is provided to receive the outer perimeter of the three-prong interface 28 in a nesting fashion. The three prongs of the three-prong interface 28 in combination with port lip 32 provide a firmer attachment with greater stability than standard two prong connections. Since a user will be using the handpiece 14 in operation, there will be pulling forces placed upon cord 16 and interface 28, and the three-prong interface 28 in combination with the lip 32 provides a more robust connection, less likely to be separated during normal use.

Figure 3:
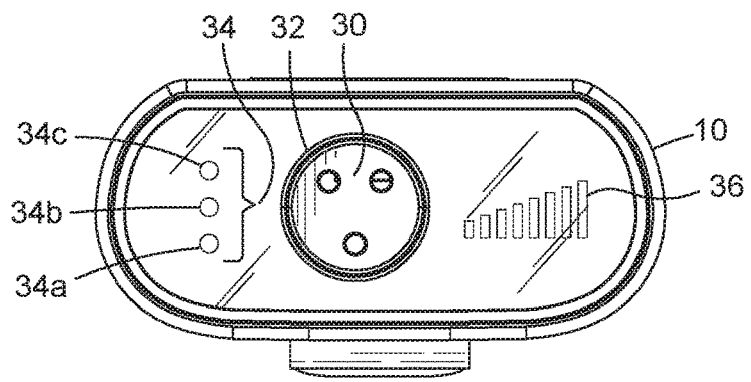
FIG. 3 is a top view of the control and power box of electric nail file.

Referring to FIG. 3, the interface port 30 is positioned toward the center of the top of the control box 10 which enables placement of indicator LEDS 34 and speed display 36 on each side of the interface port 30. The indicator LEDS 34 provide indications of on/off, forward/reverse, battery life and Bluetooth® pairing with other devices. In particular, LED 34c indicates whether the device is paired with another device via Bluetooth®. If indicator LED 34c is blinking, that indicates the control box 10 is in the process of pairing. If the indicator LED 34c is on, without blinking, this demonstrates the box 10 is paired with another device. If indicator LED 34c is off, this indicates the box 10 is not paired with another device. Indicator LED 34b demonstrates remaining battery life of the box 10, and can appear as white, orange or red. If the indicator LED 34b is white, this demonstrates that the battery life remaining is approximately 80-100%. If the indicator LED 34b is orange, this demonstrates that the battery life remaining is approximately below 80%. If the indicator LED 34b is red, this indicates that the battery life is approximately 20% or less. Finally, Indicator LED 34a demonstrates forward/reverse and power. For example, if indicator LED 34a is blinking, this means that the handpiece 14 motor is paused. If the indicator LED 34a is green this means that the power is on with the handpiece 14 motor is going forward. If the indicator LED 34a is red, this means the power is on with the handpiece 14 motor is in reverse. If the indicator LED 34a is off, then this indicates that the power is off. Also, speed indicator 36 shows eight LED lighted lines, to indicate the speed of the handpiece 14 rotating motor. The control box 10 using 8-level digital PWM motor direction control. A user can adjust speed through the click wheel 24 which causes an internal microprocessor to adjust the PWM duty cycle to the desired speed or direction. For example, the smallest line of the speed indicator 36 shows the slowest speed (closest to the center of the top of box 10), with the longest line indicating the top speed. Thus, the speed indicator 36 can show speed levels 1 through 8. For example, the shortest vertical indicator shows the slower or slowest speed and the longest vertical indicator shows the fast or fastest speed, with the intervening indicators showing incremental speeds in between.

Referring again to FIG. 2, the handpiece 14 retainer 22 includes protrusions 35, that are sized and shaped to be received and interlocked into opening 38 of the control box 10. A mirror image opening is formed on the opposite side of the control box 10 (shown in FIG. 5, for example, as opening 39). A user can elect to stow the handpiece 14 on the left side or right side of the control box 10. The retainer 22 incorporates a metal insert 40 on the inside of the opening of the retainer 22 to prevent scratching of the inside of the retainer 22, particularly when a sanding band or other tool is attached to the bit 18. The charging base 12 includes a recess 42 sized to receive the control box 10 in a nested fashion (shown in detail in FIG. 6). When inserted in the charging base 12, leads formed on the bottom of control box 10 (shown in FIG. 5) contact charging leads at the bottom of recess 42.

Figure 4:
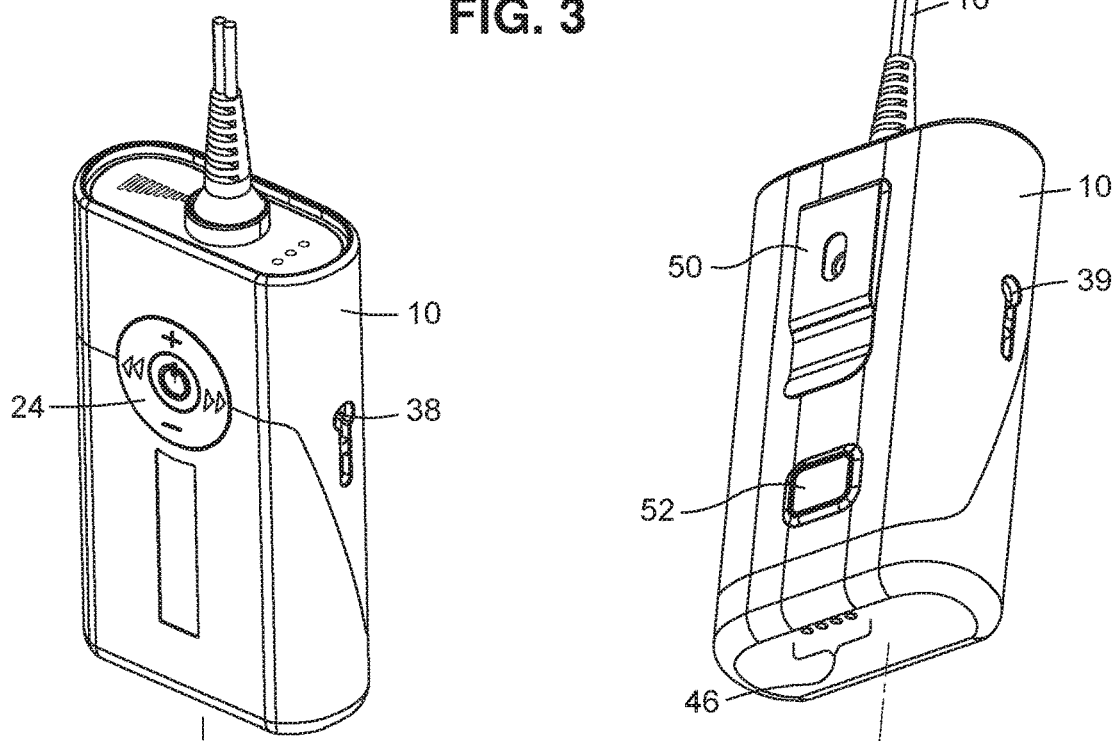
FIG. 4 is a view demonstrating placement of the control box into the recharging carriage.
Figure 5:
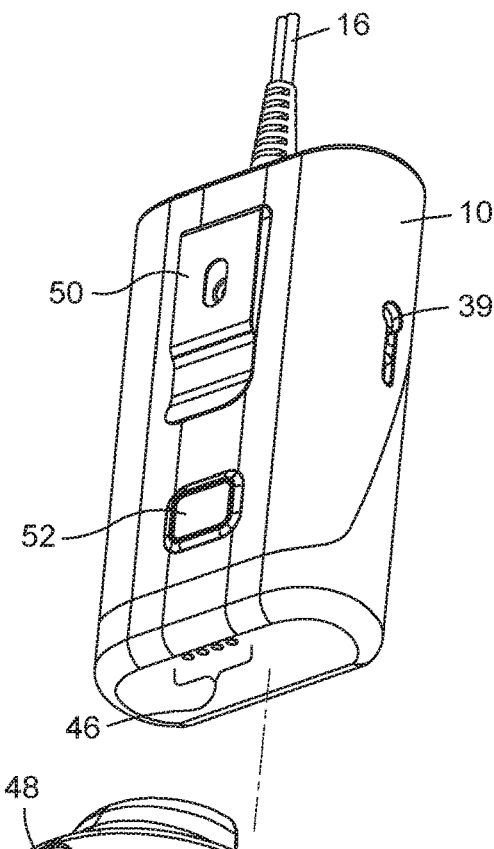
FIG. 5 is the reverse view of FIG. 4 showing placement of the control box into the recharging carriage.

Referring particularly to FIGS. 4 and 5, there is shown the charging base 12 with recess 42 including four contacts 44 formed into the bottom of the recess 42 such that when control box 10 is nested into the recess 42, contact pins 46 interface with the contacts 44. The contacts 44 can provide power to recharge an internal battery (shown in FIGS. 6-10) of the control box 10 as well as exchange data to provide information about operation of the control box 10 to the display 20. The contact pins 44 are spring loaded for more secure contact with contacts 46 and for electrical communication with internal battery. In addition, the spring loading of the contact pins 44 prevents dust and other debris from coming into contact with pins 44. The charging base 12 also includes a power port 48 for connecting the base 12 to an AC outlet to provide power to the charging base 12 to charge the internal battery of the control box 10. A power cord (shown in FIGS. 2 and 6) can interface with port 48 based on standard AC outlets found in the U.S. but can also accommodate electrical cord options for use of the base 12 in non-US standard outlets. A belt clip 50 is attached to the rear of the control box 10 for attaching the control box 10 to a belt or waist line and is biased to lock into place for secure attachment. A depress button 52 is provided to allow access to a battery (not shown) within the control box 10.

Figure 6:
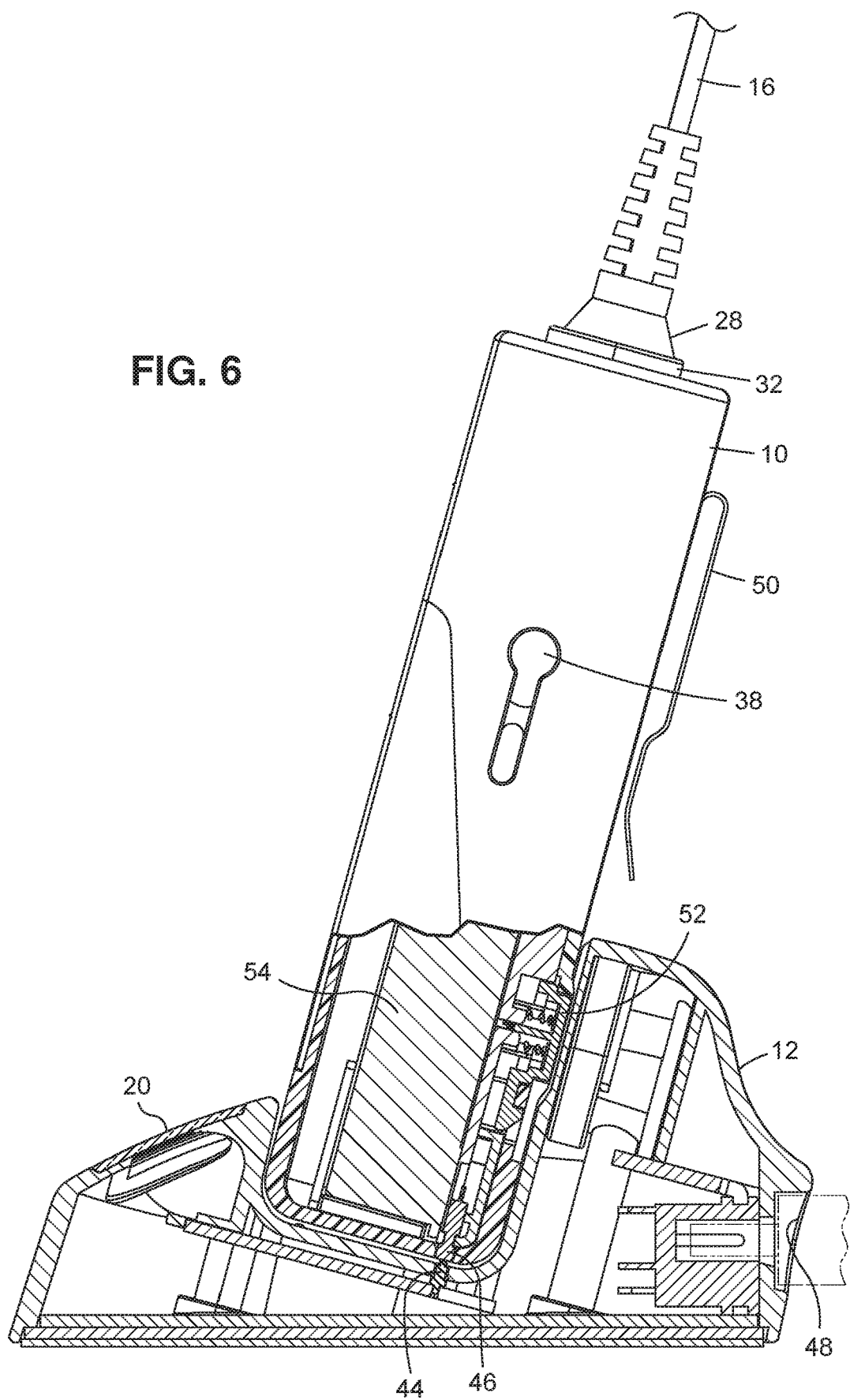
FIG. 6 is a partial cross-sectional side view of the control box resting in the recharging carriage.

Referring particularly to FIG. 6, there is shown a side view of the control box 10 nested in charging base 12 with a partial cross-sectional view. As discussed herein with regard to FIGS. 4 and 5, when the control box 10 is received in the recess 42 of the charging base 12, contacts 44 interface with contact leads 46 to supply power to the control box 10. The leads 46 interconnect to contacts 44, and when the base 12 is connected to a power source the contacts 44 through leads 46 provide power to battery 54. The charging base 12, including recess 42 is formed at an angle to facilitate use of the control box 10 with the handpiece 14 while the box 10 docked in the charging base 12. The weight of the charging base 12, along with the angle at which the box 10 rests in the base 12 reduces the possibility of pulling of the control box 10 from the charging base 12 while it is in use while being charged. The weight of the charging base 12 is designed so that when the control box 10 is cradled, the center of mass of the items aids in preventing the device from tipping, with the expected tugs on the wire 16 during use. Also, the base 12 was designed for a smaller table footprint. Also, in this position the indicator LEDs 34 (shown in FIG. 3) and speed indicator 36 on the top of the box 10 (shown in FIG. 3), would be less visible in the inclined position while charging in the base 12. As such, the base 12 includes display 20 which is visible from the front of the base 12, to allow the user to note the operations of the box 10 and handpiece 14 from the display 20. The display 20 indicators provide the same information as with the indicator LEDs 34 and speed indicator 36 and is discussed in greater detail with regard to FIG. 15.

Figures 7, 8:
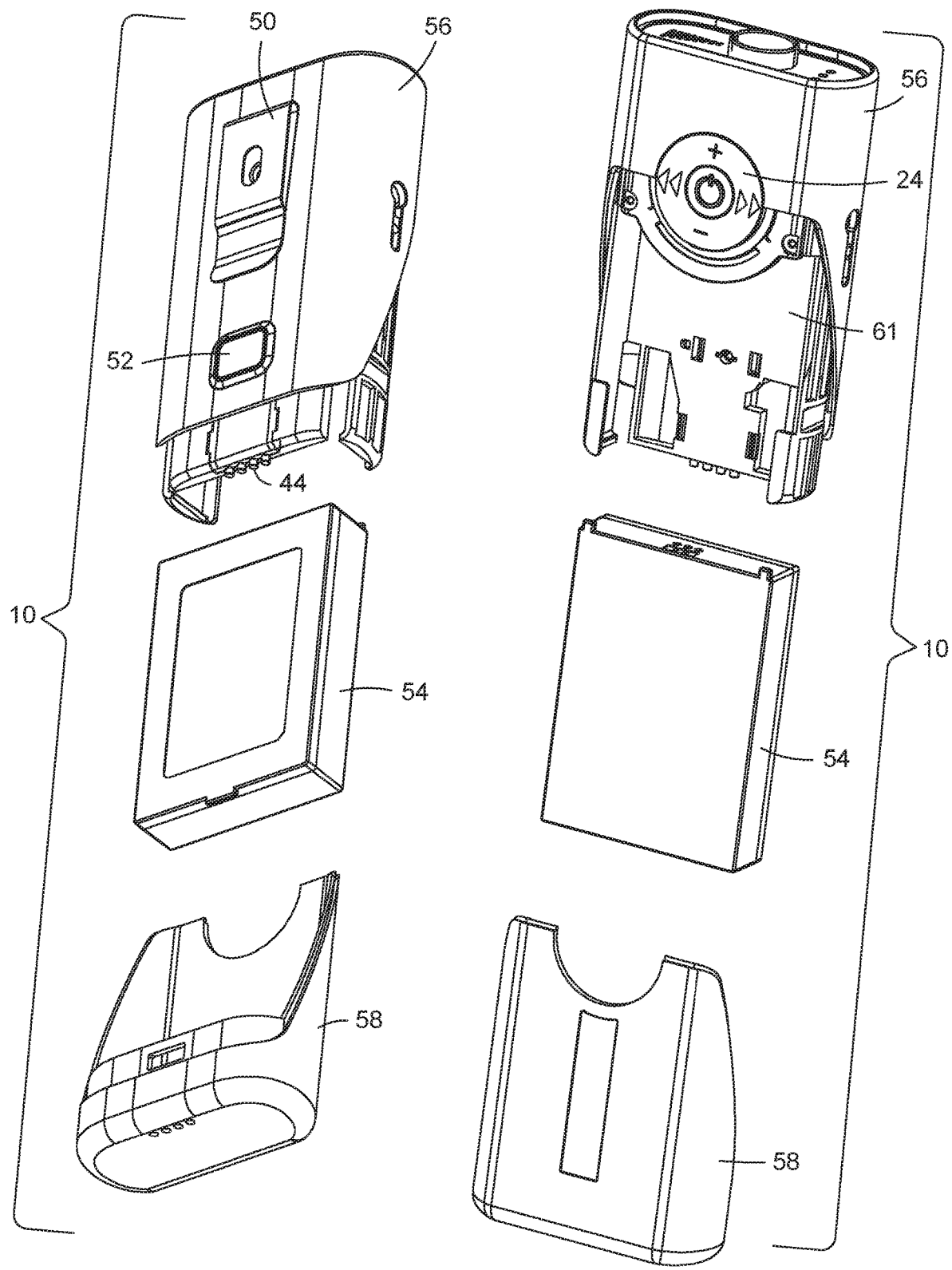
FIG. 7 is an exploded view of the control box housing showing an internal battery.
FIG. 8 is the reverse view of FIG. 7 showing an exploded view of the control box housing showing an internal battery.

Referring particularly to FIGS. 7 and 8, there are shown exploded views of the control box 10 disassembled as would be typical for a user to access the internal battery 54 or to change out housing portions. The control box 10 comprises a top housing 56 and a bottom housing 58. The top housing 56 and bottom housing 58 are each formed from rigid plastic material and are snap fit together to complete the housing for box 10. The depress button releases the bottom housing 58 from the top housing 56 to allow a user access to an internal battery 54. Unlike conventional electric nail files, the control box 10 was designed for users to access the rechargeable battery 54. The angled design of the mating top 56 and bottom 58 housing enables the release mechanism via depress button 52 and to avoid the use of screws and parting lines in molds when forming the housings 56 and 58. In addition the angled interface lines between housings 56 and 58 provides the ability to mix and match differing colors of housing 56 and 58 to provide more interesting color combinations in forming parts of the combined housing. In addition, the internal electronics, including the PC Board 61, incorporating the microprocessor and memory are hidden from access in the top housing 56 and the top housing 56 has all of the critical components for digital operation. As such it is more likely that the bottom housing 58 might be provided in multiple variations including, but not limited to in different colors, textures or materials for replacement or changing to provide varying visual configurations. Also, with depress button and snap fit, removal of the design cover for battery replacement eliminates the need for tools and repair persons to change the battery or change of cover for differing top and bottom combinations such as color combinations. The combination housing of 56 and 58 was designed to minimize weight while providing an interior chamber for receiving a battery 54. The battery 54 is a rechargeable lithium ion battery with a long life, and the need to change the battery may be infrequent depending on use and battery quality, however, the ease of the housing 56 and 58 separation allows a user easy access to the battery for replacement without the need for a technician or repair person. Also, the combination housing of 56 and 58 is designed so that the battery 54 can only be received in a single orientation or single direction, further making battery replacement user friendly. Inserted in the proper configuration the battery 54 aligns with a PC board to provide power and be in electrical communication to the control box 10.

Figure 9:
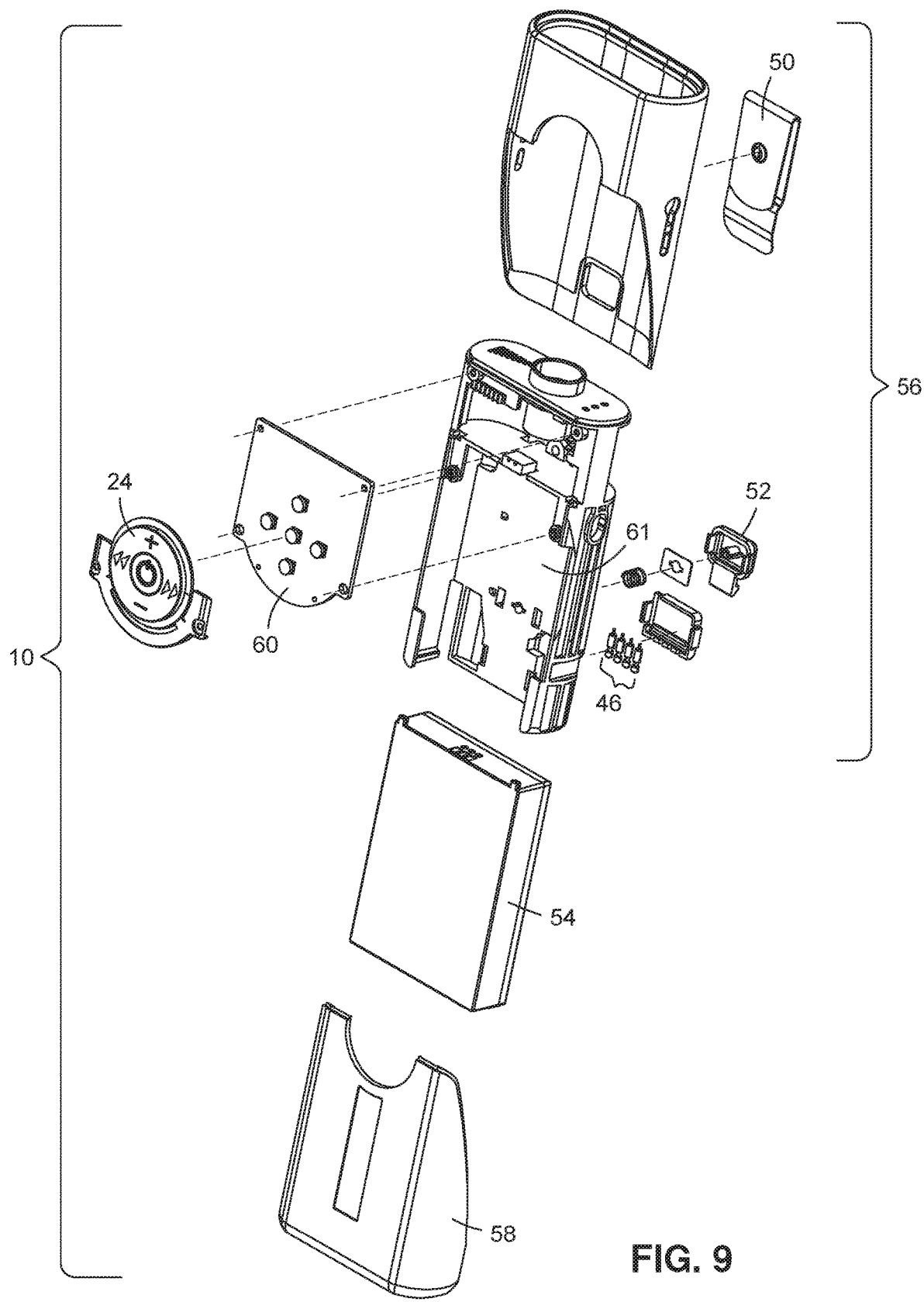
FIG. 9 is a further exploded view of the control box housing with electronic components exploded from the housing.
Figure 10:
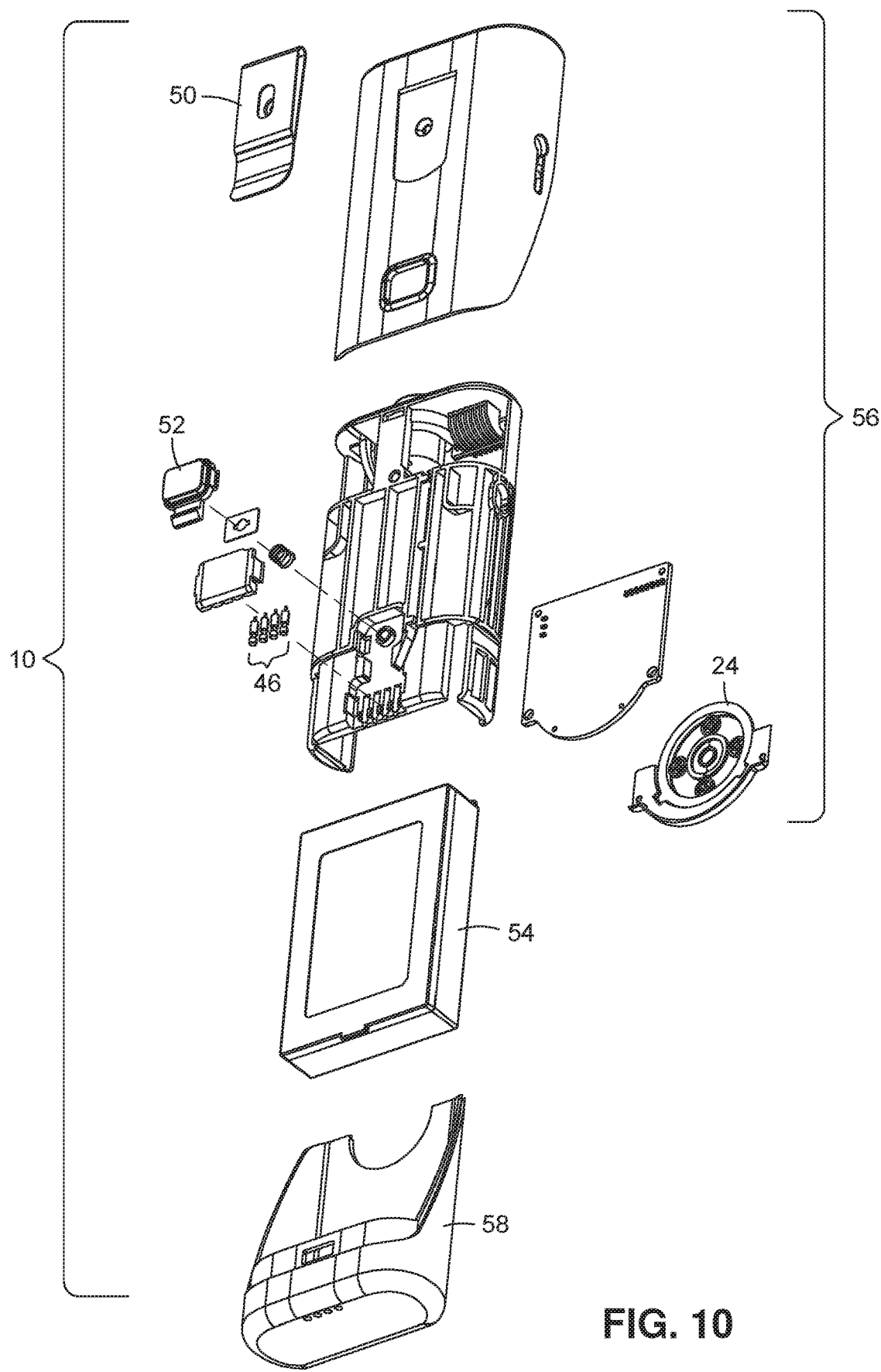
FIG. 10 is the reverse view of FIG. 9 showing the further exploded view of the control box housing with electronic components exploded from the housing.
Figure 11:
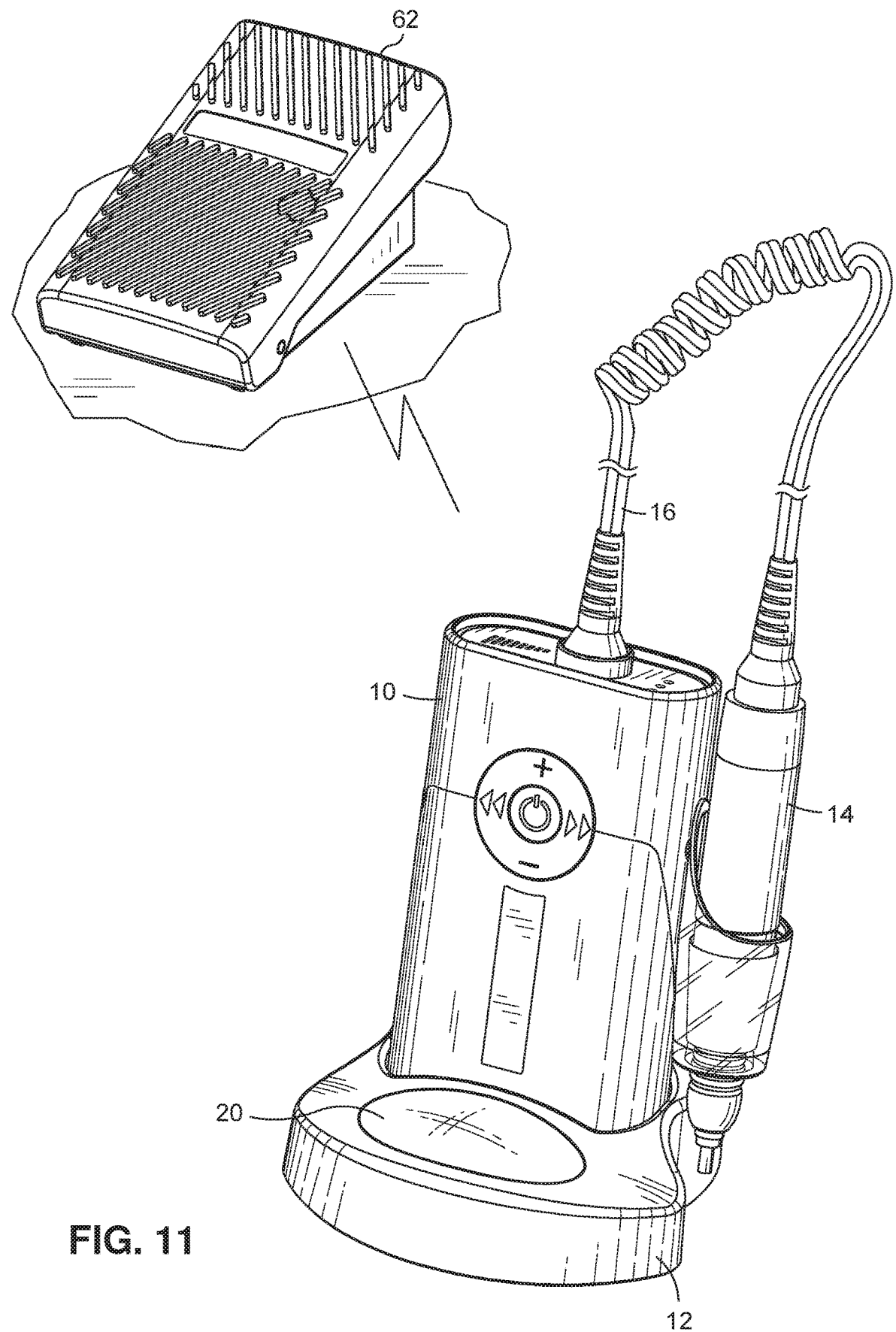
FIG. 11 is a system view of the portable digital electric nail file in a charging cradle in wireless communication with a control foot pedal.
Figure 12:
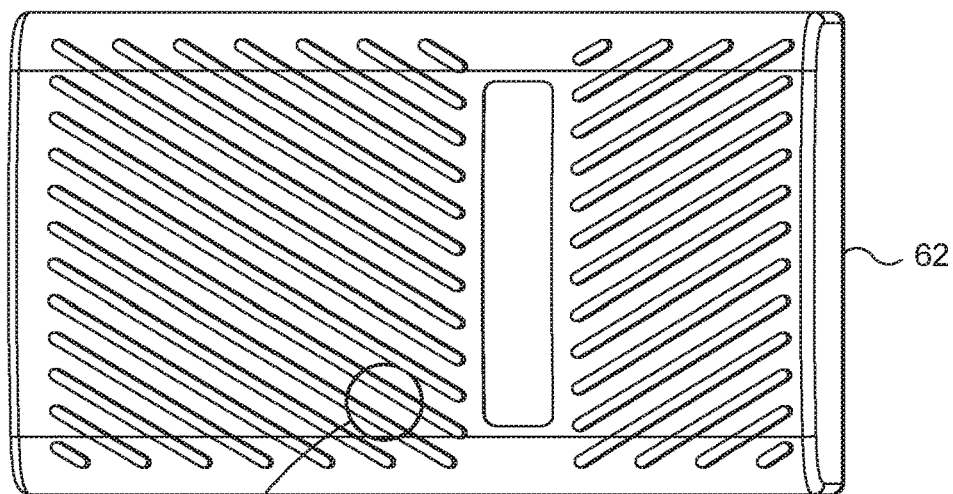
FIG. 12 is a top view of the control pedal.

Referring particularly to FIGS. 9 and 10 there is shown reverse views of exploded and separated views of the control box 10. Housing 56 is shown in exploded disassembled view showing the touch sensors 60 that underly the click wheel 24 to provide input in the operation of the control box 10. Electronic components such as the control circuitry (see FIG. 17) which may include a processor, memory and RF transceiver (not shown) and power control circuitry (see FIG. 18) which may include a processor and memory (not shown) and reside on the underside of electronics board 61. The location of the digital circuitry components on the interior side of PCB board 61 prevents the electronics from exposure to the user when the device is opened for change of battery or cover replacement. Because the electronics are positioned internally, such components are less susceptible to damage or exposure to the elements.

Figure 13:
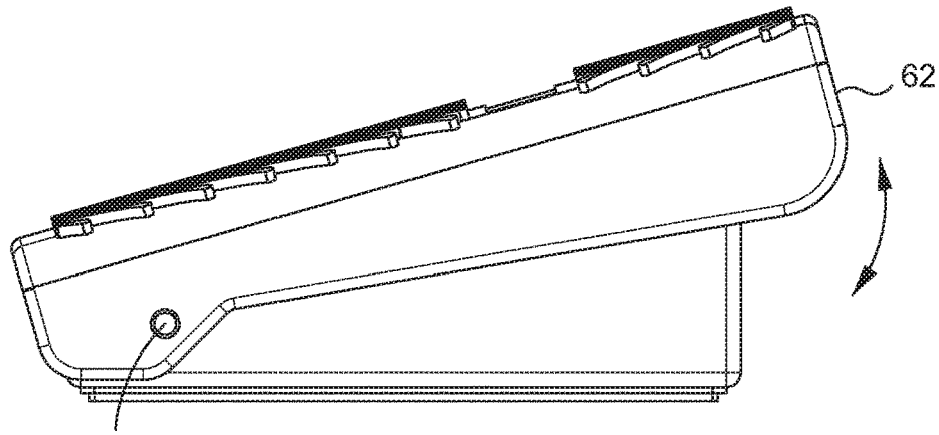
FIG. 13 is side view of the control pedal.
Figure 14:
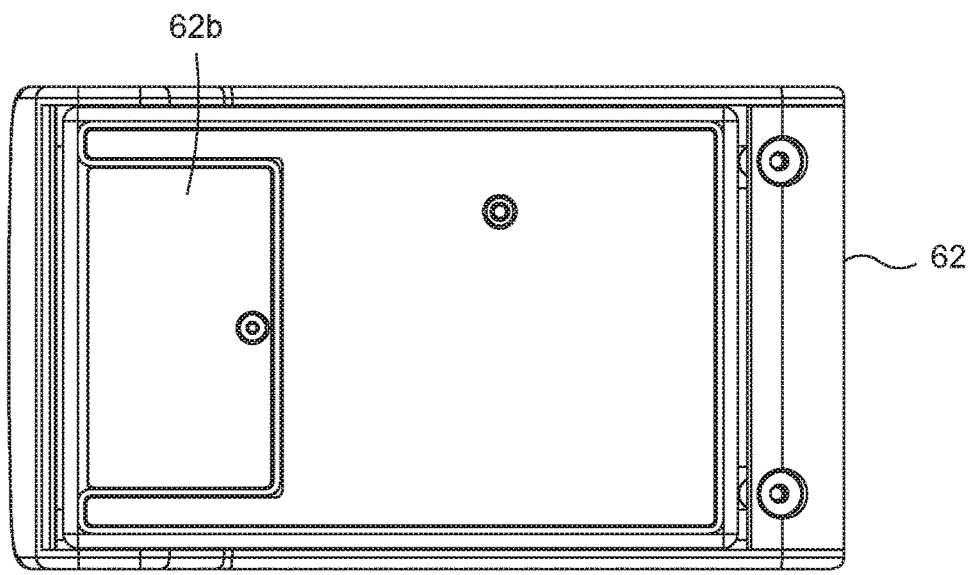
FIG. 14 is a bottom view of the control pedal.

Referring particularly to FIGS. 11-14, there is shown the control box 10 in Bluetooth® communication via wireless signal with a foot pedal 62. The wireless foot pedal 62 uses Bluetooth® low energy to wirelessly connect to the control box 10. As such, the pedal 62 and the control box 10 require no physical connection thus increasing the mobility of the control box 10 which in conventional electric nail files are limited by the length of the connection of a control/power cord. The foot pedal 62 is powered by a replaceable alkaline battery such as AA or AAA or may include a rechargeable battery and uses high efficiency power saving design to extend battery life. The onboard microprocessor and Bluetooth of the foot pedal 62 turn into sleep mode when there has been no use of the foot pedal for 15 seconds and returns to wake mode when the pedal is moved. In addition, the user can set the highest speed on the control box, to limit the speed when the pedal 62 is used. For example, a user may decide that he or she wishes to limit the pedal 62 speed to level 5 of 8. As such the user can set the control box 10 speed at 5, so that when the user deploys the foot pedal 62, the speed of the handpiece 14 will not exceed level 5. Located within the housing of foot pedal 62 are digital electronic components that form the logic and power controller along with a BLE wireless transceiver (see FIG. 19). In operation a user places a foot on the inclined surface of pedal 62, as best shown in FIG. 13. Pressing down using the toe area of the foot, causes the inclined surface of foot pedal to move rotationally downward about a pivot 63 as shown in FIG. 13. Internal contacts (not shown) dictate the desired motor speed which sensed or inputted to a microprocessor which may broadcast a Bluetooth® or BLE signal to be received by the control box 10 for control of the motor speed. An LED indicator such as shown in 62a may provide the user with the status of the foot pedal 62. A battery access door 62b may provide access for insertion or removal of replaceable batteries (not shown). Buttons and pairing indicator LEDs may be provided on the foot pedal 62 as is typical with BLE enabled devices.

Figure 15:
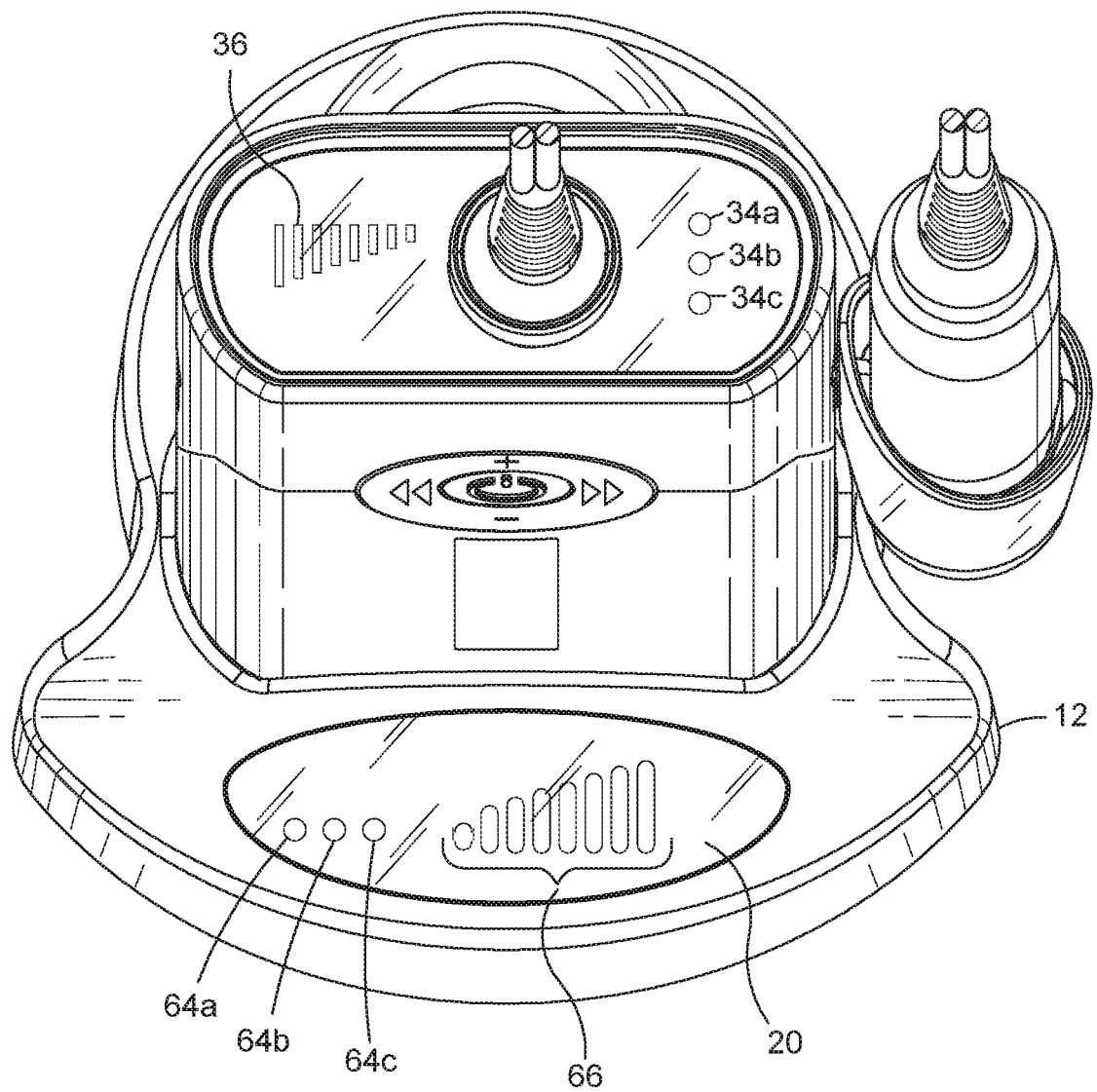
FIG. 15 is view of the display screen on the recharging base.

Referring to FIG. 15, there is shown a representative display output for display 20 on the base 12. The output for display 20 may provide the similar or identical information as provided with regard to indicator LEDs 34a, 34b and 34c and speed indicator 36 in a slightly different arrangement. In particular, LED 64c indicates whether the device is paired with another device via Bluetooth®. If indicator LED 64c is blinking, that indicates the control box 10 is in the process of pairing. If the indicator LED 64c is on, without blinking, this demonstrates the box 10 is paired with another device. If indicator LED 64c is off, this indicates the box 10 is not paired with another device. Indicator LED 64b demonstrates remaining battery life of the box 10, and can appear as white, orange or red. If the indicator LED 64b is white, this demonstrates that the battery life remaining is approximately 80-100%. If the indicator LED 64b is orange, this demonstrates that the battery life remaining is approximately less than 80%. If the indicator LED 64b is red, this indicates that the battery life is approximately 20% or less. Finally, Indicator LED 64a demonstrates forward/reverse and power. For example, if indicator LED 64a is blinking, this means that the handpiece 14 motor is paused. If the indicator LED 64a is green this means that the power is on with the handpiece 14 motor is rotating forward. If the indicator LED 64a is red, this means the power is on with the handpiece 14 motor is in reverse. If the indicator LED 64a is off, then this indicates that the power is off. Also, speed indicator 66 shows eight LED lighted lines, to indicate the speed of the handpiece 14 rotating motor. The control box 10 using 8-level digital PWM motor direction control. A user can adjust speed through the click wheel 24 (or foot pedal) which causes an internal microprocessor to adjust the PWM duty cycle to the desired speed or direction. For example, the smallest line of the speed indicator 66 shows the slowest speed (closest to the center of display 20), with the longest line indicating the top speed. Thus, the speed indicator 66 can show speed levels 1 through 8. For example, the shortest vertical indicator shows the slower or slowest speed and the longest vertical indicator shows the fast or fastest speed, with the intervening indicators showing incremental speeds in between.

Figure 16:
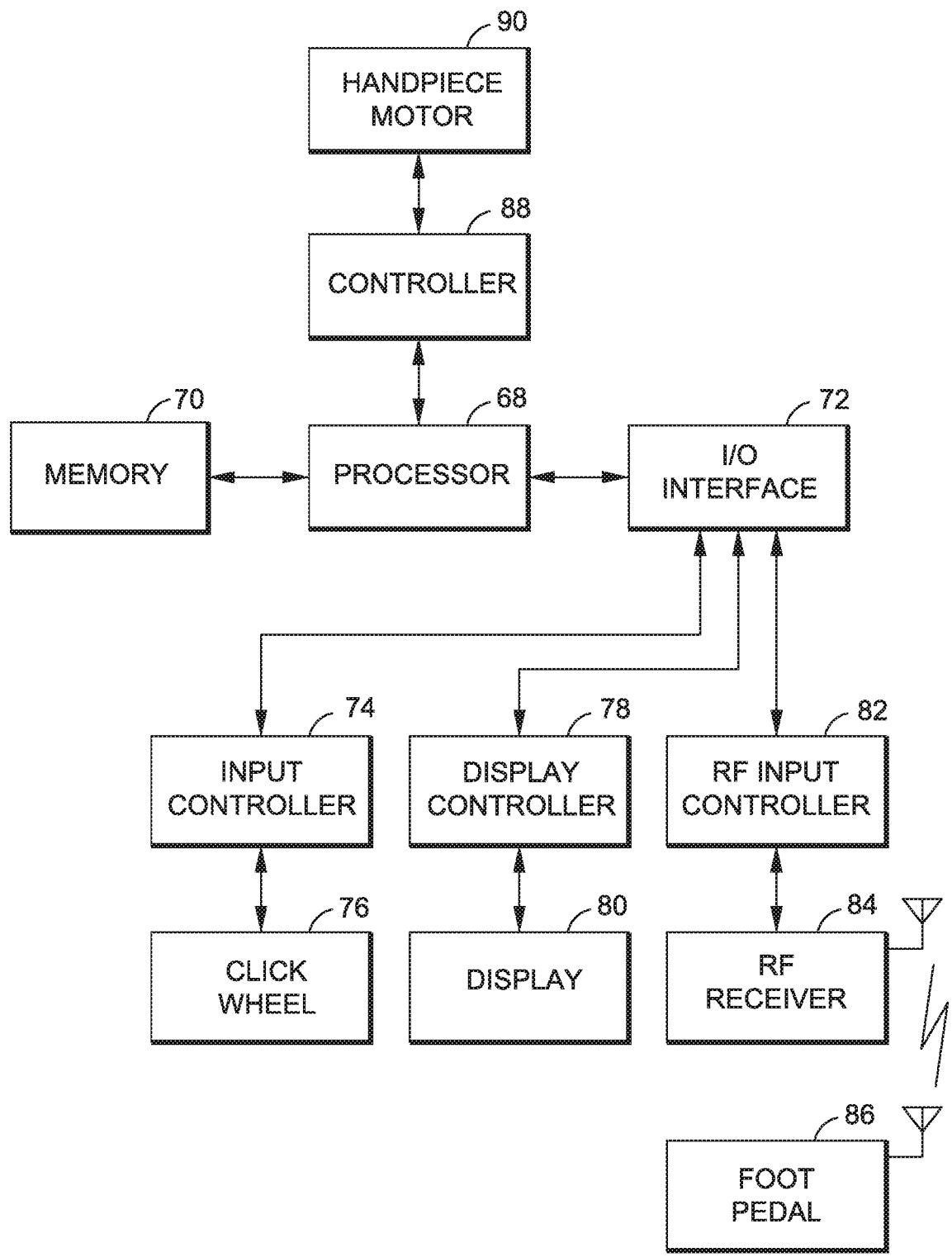
FIG. 16 is a functional block diagram of the digital operational components of the disclosed device.

Referring to FIG. 16 there is shown an example of a functional block diagram of a configuration of digital operational components and systems of the control box 10. Operations include a processor 68 configured to execute software instructions stored on a memory 70 that may include a tangible, non-transitory computer readable storage medium (e.g., hard drive, solid state drive, RAM, flash, ROM, etc.). Further, aspects of the disclosed technologies can be embodied as an embedded or computer program product that includes the memory 70 storing the software instructions that causes a processor 68 to execute the disclosed steps associated with implementations of computer-based algorithms, processes, methods, or other instructions. The software instructions preferably configure the processor to detect user input through an input/output interface 72 in electrical communication with an input controller 74 that receives inputs from a user through the click wheel 76. Also, the processor 68 may drive data through the input/output interface to a display controller 78 that drives a display 80. The display 80 may be one or both of the display 20 described with regard to FIG. 15, or the speed indicator 36 and indicator LEDs 34 described with respect to FIG. 3. The processor 68 may also receive user input through the input/output interface 72 from a radio frequency (RF) input controller 82 coupled to an RF receiver 84. The RF receiver 84 and foot pedal 86 RF transmitter is Bluetooth® connection, but can be any suitable wireless connections, Wi-Fi, radio frequency, RFID, Wi-Fi Direct, cellular, infrared, WiMAX, Zigbee, or WiGIG connections. Communication to or from the RF receiver 84 and RF transmitter of the foot pedal 86 components can include long-range communications or communications such as cellular communication and Wi-Fi.

In operation the RF receiver 84 receives user input from a foot pedal 86, as described as foot pedal 62 in relation to FIGS. 11-14. The foot pedal 86 includes an RF transmitter to transmit data from the user's operation of the foot pedal 86 to the RF receiver 84. In operation, upon receiving user input from one or more of the click wheel 76 or foot pedal 86, the processor 68, through software instructions residing on memory 70, directs a controller 88 to operate the handpiece motor 90. In this regard the processor 68 may drive, adjust speed, halt or reverse motor 90 operation. At the same time, the processor 68 may display speed and direction of the motor as discussed herein with respect to the disclosed apparatus on display 80 which can be the display 20 described with reference to FIG. 15 or the speed indicator 36 and/or LED indicators 34 with reference to FIG. 3.

Software resident on the memory 70 enables the processor 60 to retain data on the motor 90 speed and direction. After the device 10 is powered down, upon restarting, the memory 70 and processor remembers last settings of motor speed so that when the devices powers up, it operates at the same settings. When the battery is removed or the system is not coupled to a power source, forgets last settings, and defaults to slowest speed and forward direction when the device is turned on.

The processor 68 and memory 70 implements a switchless motor direction control. The disclosed device uses H bridge MOSFET circuit design to control motor direction, and when motor 90 changes direction, the motor 90 has enough time (approximately 2 seconds) to break-stop-reverse to avoid high pulse current to occur which helps to extend motor and battery cycle life. In this regard, the handpiece motor 90, upon a user's command to change direction, pauses automatically and then changes direction.

As used in the description herein and throughout the claims that follow, when a system, engine, server, device, module, or other computing element is described as configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

The system of the disclosed device synchronizes LED light display between control box 10 (the speed indicator 36 and indicator LEDs 34 described with respect to FIG. 3) and the base display 20 to allow user to see the speed and direction during use while control box is in charging base 12.

A replacement or second battery may be provided to replace the system battery. In this way the secondary battery can be fully charged or can be charging and can replace first battery without having wait for control box 10 to recharge the battery.

It is disclosed that the handpiece motor speed may be driven by variable speed control. Variable speed control is more fluid in operations and facilitated by the digital control. Likewise, variable speed control can be translated through the use of the foot pedal 86. Variable speed control may be in the form of a software module executed by the processor 68 resident on the memory 70.

The system may include a power manager for supplying power to operate the various components of the device. Power management include incorporating one or more power sources such as a battery or AC power. Also, the power manager may act to recharge a battery and to detect degree of battery charge and to supply that information to the processor for display on one or more display devices such as a display screen 20 (FIG. 15) or speed indicators 36 and/or LED indicators 34 (FIG. 3).

Figure 17:
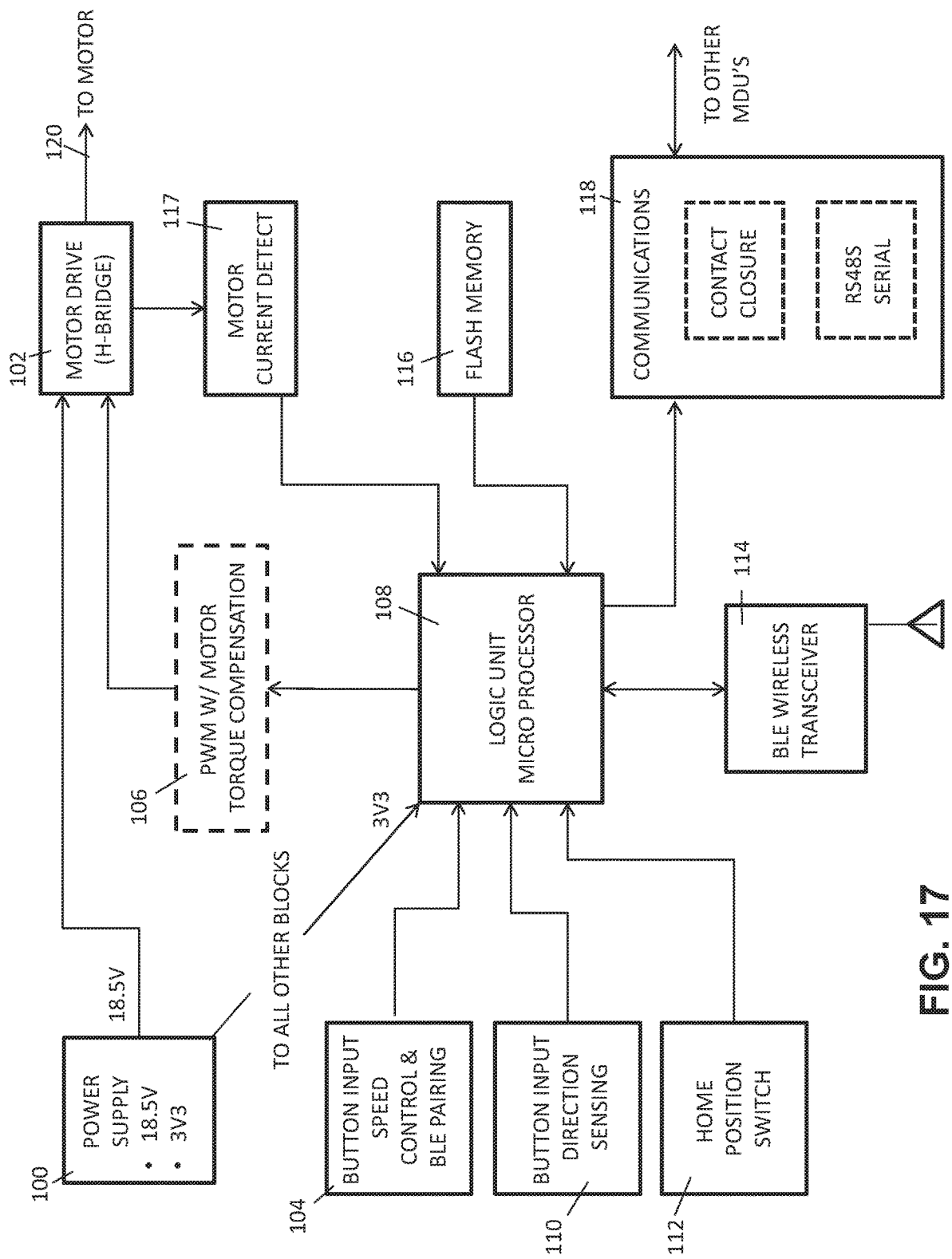
FIG. 17 is a functional block diagram of the digital operational components of the device controller.

Referring to FIG. 17 there is shown an example of control circuitry included in control box 10 (not shown). A logic unit or microprocessor 108 controls operation of the handpiece 14 motor (not shown) through connection 120. User input is received through inputs 104, 110 and 112 through for example button input for speed control and BLE pairing through input 104. Also, motor rotation direction through button input 110. Also, a home position switch 112 can provide, among other things, a power command to turn box 10 on and off. Also, commands for operation of the motor may be provided through a BLE wireless transceiver 114. The logic unit 108 controls the motor through motor drive 102 with motor torque compensation being throttled, adjusted or compensated through PWM 106. A motor current detector circuit 117 provides feedback to the logic unit 108. The motor drive 102 drives the motor and receives power from power supply 100. A flash memory 116 may include stored software instructions for access by the logic unit for performing operations based on software modules stored in the memory 116. Also, the memory 116 may provide a temporary storage of data. For example, memory 116 may store the speed or direction setting at the time the device was last powered down. As such, when re-started the control box 10 (not shown) may recall the information of the last use of the device. A communication module 118 may be shared with, for example, a digital power circuitry.

Figure 18:
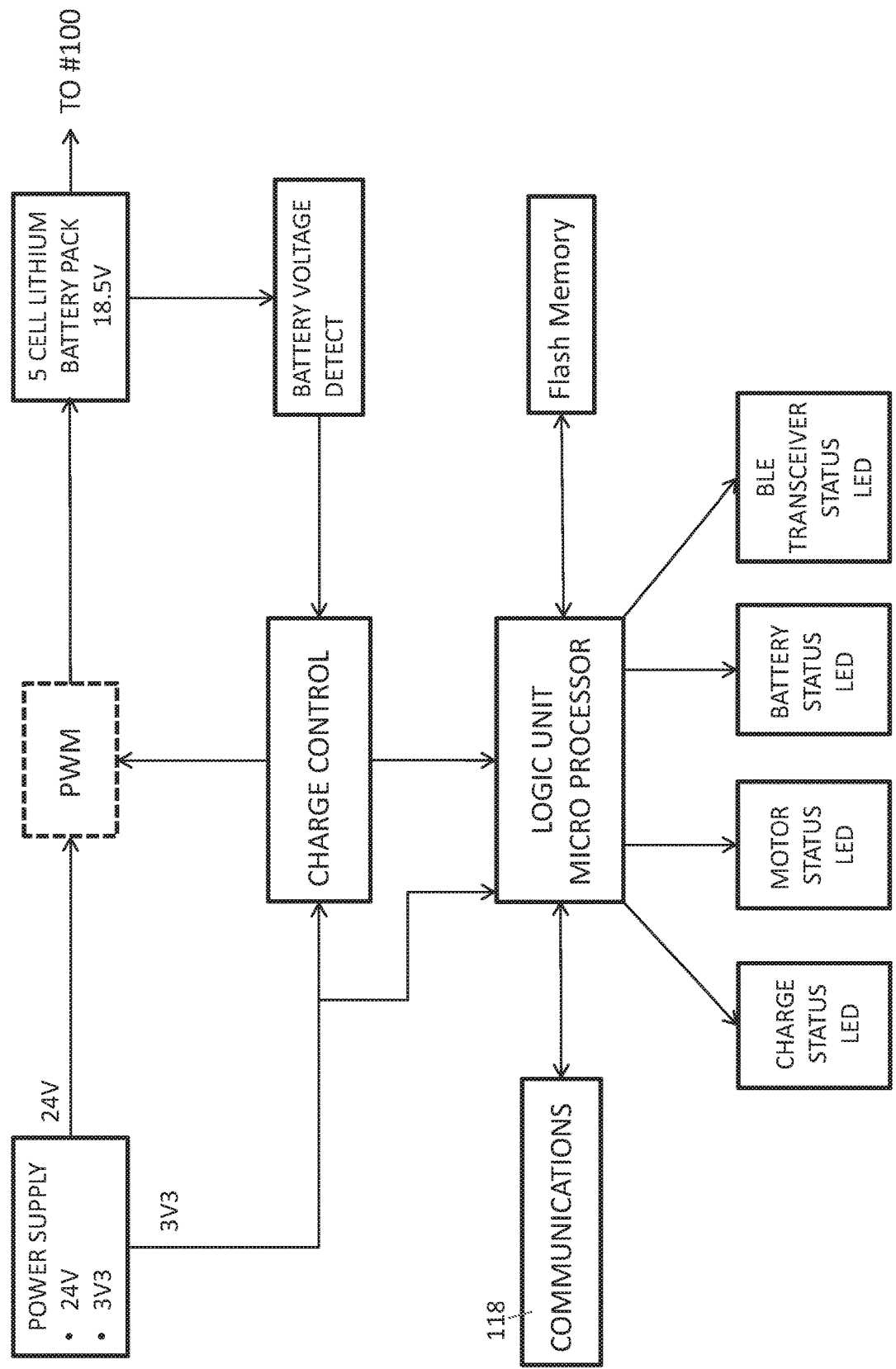
FIG. 18 is a functional block diagram of the digital operational components of the device power supply.

Referring to FIG. 18 there is shown a digital control circuitry for power control of the various components of the system. A communication module 118 places the power control in communication with the control circuitry (see FIG. 17). A logic unit or microprocessor of the power circuitry of FIG. 18 operates to direct charging of batteries and provide power to the control circuitry and motor (see FIG. 17), for example, by pulse width modulation with a battery voltage detection feedback circuit, as well as to provide power and operation status to the various status LEDs described herein. These may include, for example, a charge status LED, a motor status LED, a battery status LED, and/or a BLE transceiver status LED as shown.

Figure 19:
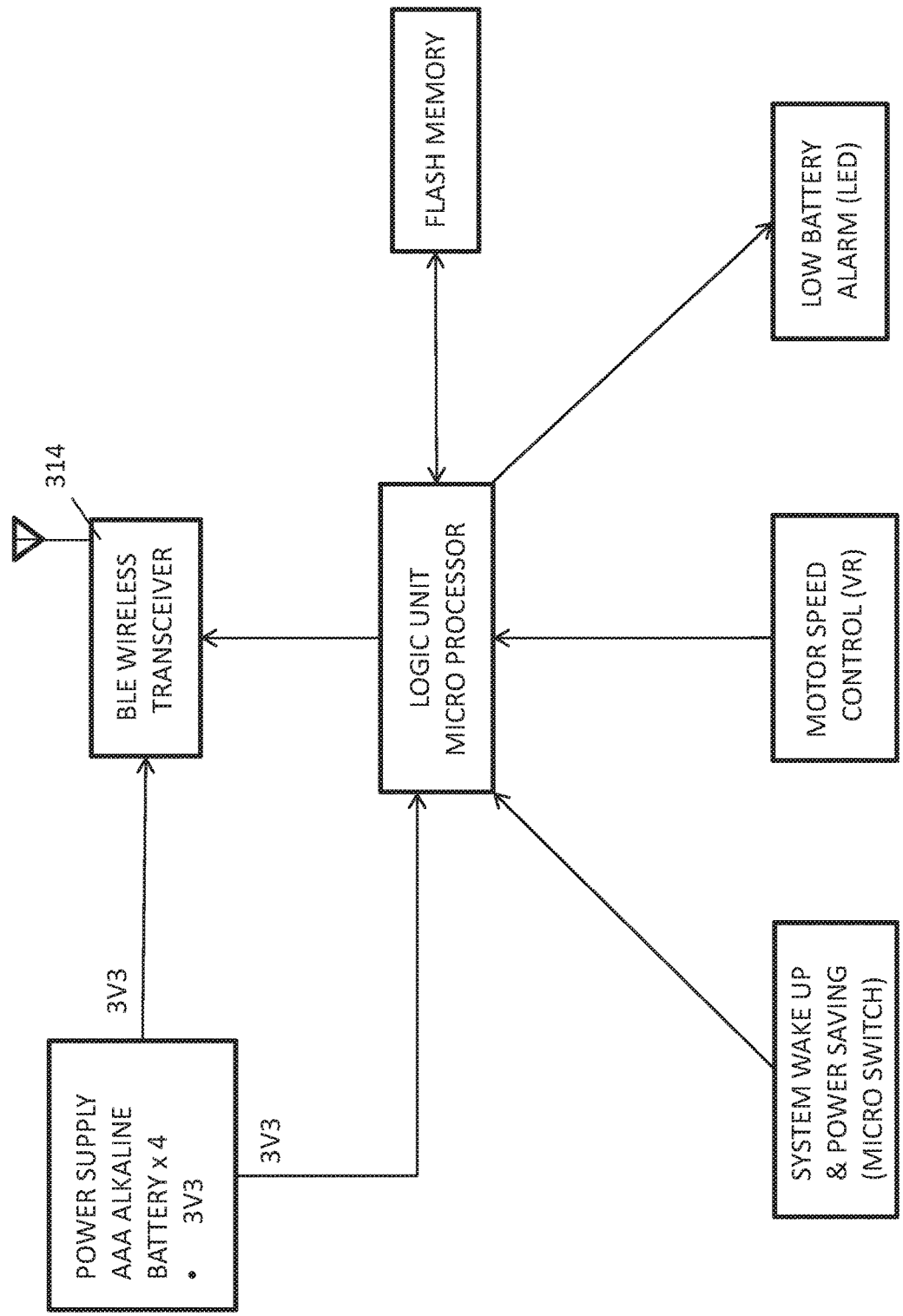
FIG. 19 is a functional block diagram of the digital operational components of the RF connected foot pedal.

Referring to FIG. 19 there is shown the foot pedal control circuitry. A logic unit or microprocessor in communication with a memory such as a flash memory may receive a user input of a desired motor speed according to the position of the foot pedal. In response thereto, a wireless transceiver 314 may transmit a signal to be received by the RF receiver 84 of the electric nail file control box 10. As noted above, the pedal control circuitry may additionally include circuitry for power saving sleep and wake modes as well as power supply circuitry to provide power from one or more replaceable batteries.

The above description is given by way of example, and not limitation. Given the above disclosure, one skilled in the art could devise variations that are within the scope and spirit of the disclosure herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A portable electric nail filing system, the system comprising:
   an electric nail file handpiece;
   a control box in electrical communication with the handpiece via a flexible external electrical cord, the control box for supplying power to the electric nail file handpiece, the control box including a rechargeable battery and a processor; and
   a charging base for docking the control box, the charging base comprising:
   a recess formed in the charging base for receiving at least a portion of the control box, the charging base operable to recharge the rechargeable battery of the control box while the control box is received within the charging base recess; and
   a display for displaying operational data of the electric nail file handpiece, the operational data being output by the processor of the control box during operation of the electric nail file handpiece while the control box is received within the charging base recess.

2. The portable electric nail filing system of claim 1, wherein the display includes a speed indicator comprising a series of LEDs corresponding to selectable duty cycles of a pulse width modulation control signal output by the control box to control a motor of the electric nail file.

3. The portable electric nail filing system of claim 1, wherein the charging base is adapted to be placed on a support surface wherein the recess is formed at an angle relative to the support surface to facilitate use of the electric nail file handpiece while the control box is docked with the charging base.

4. The portable electric nail filing system of claim 1, wherein the control box and the recess of the charging base include corresponding electrical contacts that interface to supply power from the charging base to the rechargeable battery of the control box.

5. The portable electric nail filing system of claim 1, wherein the control box includes a top housing, a bottom housing that snap fits to the top housing, and a release button for releasing the bottom housing from the top housing to allow access to the rechargeable battery.

6. The portable electric nail filing system of claim 1, wherein the control box includes a radio frequency receiver for receiving a wireless signal from a foot pedal, and the processor operates the electric nail file handpiece based on the wireless signal received from the foot pedal.

7. The portable electric nail filing system of claim 6, wherein the wireless signal comprises a Bluetooth signal.

8. The portable electric nail filing system of claim 6, wherein the wireless signal comprises a Bluetooth low energy (BLE) signal.

9. The portable electric nail filing system of claim 6, further comprising the foot pedal, wherein the foot pedal includes a foot depressible member movable between at least two positions and a radio frequency transmitter for transmitting the wireless signal responsive to movement of the foot depressible member between the at least two positions.

10. The portable electric nail filing system of claim 1, wherein the control box includes a control interface for receiving a manual user input, and the processor operates the electric nail file handpiece based on the manual user input received by the digital control interface.

11. The portable electric nail filing system of claim 10, wherein the control interface comprises a click wheel.

12. The portable electric nail filing system of claim 11, wherein the click wheel includes input locations for adjusting a speed and a direction of a motor of the electric nail file.

13. The portable electric nail filing system of claim 1, wherein the control box includes a control box display disposed on the control box operable to display data related to operation of the electric nail file handpiece.

14. The portable electric nail filing system of claim 13, wherein the control box display includes a speed indicator comprising a series of LEDs corresponding to selectable duty cycles of a pulse width modulation control signal output by the control box to control a motor of the electric nail file.

15. The portable electric nail filing system of claim 1, wherein the processor operates the electric nail file by controlling a motor of the electric nail file using pulse width modulation.

16. The portable electric nail filing system of claim 15, wherein the processor controls a direction of the motor using a MOSFET H-bridge.

17. The portable electric nail filing system of claim 1, wherein the control box includes a memory for retaining data related to a motor speed and direction of the electric nail file handpiece while the control box is powered down so as to resume operation of the electric nail file handpiece at the same motor speed and direction when the control box is subsequently powered up.

18. The portable electric nail filing system of claim 1 wherein the operational data of the electric nail file comprises one or more of the following: speed of rotation and direction of rotation.

19. The portable electric nail filing system of claim 1 wherein the display displays status data of the control box output by the processor of the control box.

20. The portable electric nail filing system of claim 19 wherein the status data of the control box comprises one or more of the following: power status, charge status and capacity.

21. A portable electric nail filing system, the system comprising:
a control box in electrical communication with an electric file handpiece via a flexible external electrical cord, the control box for supplying power to the electric nail file handpiece, the control box including a rechargeable battery and a processor; and
a charging base for placement on a support surface, the charging base comprising:
a recess for receiving at least a portion of the control box, the charging base operable to recharge the rechargeable battery of the control box while the control box is received within the charging base recess; and
a display for displaying operational data of the electric nail file handpiece being output by the processor of the control box during operation of the electric nail file handpiece.

22. The portable electric nail filing system of claim 21 wherein the recess is formed at an angle relative to the support surface to facilitate use of the electric nail file handpiece while the control box is docked with the charging base.

23. The portable electric nail filing system of claim 21 wherein the operational data of the electric nail file comprises one or more of the following: speed of rotation and direction of rotation.

24. The portable electric nail filing system of claim 21 wherein the display displays status data of the control box output by the processor of the control box.

25. The portable electric nail filing system of claim 24 wherein the status data of the control box comprises one or more of the following: power status, charge status and capacity.

26. A portable electric nail filing system, the system comprising:
an electric nail file handpiece;
a foot pedal including a foot depressible member movable between at least two positions and a radio frequency transmitter for transmitting a wireless signal responsive to movement of the foot depressible member between the at least two positions;
a control box in electrical communication with the handpiece via a flexible external electrical cord, the control box for supplying power to the electric nail file handpiece, the control box including a rechargeable battery, a radio frequency receiver for receiving the wireless signal from the foot pedal, and a processor for operating the electric nail file handpiece based on the wireless signal received from the foot pedal; and
a charging base comprising a recess for receiving at least a portion of the control box, said control box being in electrical communication with the charging base when received within the control box, said control box further comprising a display for displaying operational data of the electric nail file handpiece the operational data being output by the processor of the control box during operation of the electric nail file handpiece while the control box is received within the charging base recess.

* * * * *